US 8,363,971 B2
Jan. 29, 2013

(12) United States Patent
Sato

(10) Patent No.: US 8,363,971 B2
(45) Date of Patent: Jan. 29, 2013

(54) IMAGE PROCESSING APPARATUS AND IMAGE PROCESSING METHOD

(75) Inventor: Yousuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/792,986

(22) Filed: Jun. 3, 2010

(65) Prior Publication Data

US 2010/0310191 A1    Dec. 9, 2010

(30) Foreign Application Priority Data

Jun. 9, 2009 (JP) ................................ 2009-138647

(51) Int. Cl.
*G06K 9/00* (2006.01)
*G06K 9/46* (2006.01)
*G06K 9/66* (2006.01)
*H04N 7/01* (2006.01)
*H04N 11/20* (2006.01)
*H04N 7/04* (2006.01)
*H04N 7/00* (2006.01)
*H04N 11/00* (2006.01)

(52) U.S. Cl. ........ 382/254; 382/107; 382/162; 382/190; 348/441; 348/469; 348/497

(58) Field of Classification Search ................. 382/107, 382/162, 181, 190–191, 195, 224, 254–264, 382/266, 275–276, 282, 284, 307–308; 348/441–459, 469, 497, 571, 575, 607, 625

See application file for complete search history.

(56) References Cited

U.S. PATENT DOCUMENTS

| 6,304,684 | B1 * | 10/2001 | Niczyporuk et al. ......... 382/318 |
| 6,390,980 | B1 * | 5/2002 | Peterson et al. ............. 600/443 |
| 7,505,074 | B2 | 3/2009 | Yoshino et al. |
| 7,542,619 | B2 | 6/2009 | Toyooka et al. |
| 2004/0095487 | A1 | 5/2004 | Sato |
| 2004/0125421 | A1 | 7/2004 | Sato |

(Continued)

FOREIGN PATENT DOCUMENTS

| EP | 2 023 315 A2 | 2/2009 |
| JP | 2002-351382 A | 12/2002 |

(Continued)

OTHER PUBLICATIONS

Sep. 23, 2011 European Search Report in European Patent Appln. No. 10165300.4.

(Continued)

*Primary Examiner* — Anand Bhatnagar
*Assistant Examiner* — Nathan Bloom
(74) *Attorney, Agent, or Firm* — Fitzpatrick, Cella, Harper & Scinto

(57) ABSTRACT

A composition unit generates a composite image by compositing a frame image of interest and a processed image obtained by applying minimum value filtering processing to the frame image of interest. An LPF processor generates a low frequency component image by applying low-pass filtering processing to the composite image. A difference detector generates a difference image between the frame image of interest and the low frequency component image, and an adder generates a high frequency component image by adding the difference image to the frame image of interest. The composition unit executes composition processing using a minimum composite ratio a so that all pixel values which configure a region in the high frequency component image corresponding to a steep edge region in the composite image are equal to or larger than zero.

16 Claims, 14 Drawing Sheets

U.S. PATENT DOCUMENTS

| | | | |
|---|---|---|---|
| 2005/0168655 A1* | 8/2005 | Wyman et al. | 348/700 |
| 2006/0119617 A1 | 6/2006 | Toyooka et al. | |
| 2006/0268001 A1 | 11/2006 | Sato | |
| 2008/0158431 A1* | 7/2008 | Russell | 348/712 |
| 2009/0040374 A1* | 2/2009 | Kobayashi | 348/448 |
| 2009/0060365 A1* | 3/2009 | Nagata et al. | 382/255 |
| 2009/0080769 A1* | 3/2009 | Kagawa et al. | 382/162 |
| 2009/0207186 A1 | 8/2009 | Toyooka et al. | |
| 2009/0226110 A1* | 9/2009 | Chen et al. | 382/263 |
| 2009/0273611 A1 | 11/2009 | Itokawa et al. | |
| 2011/0081095 A1* | 4/2011 | Sakashita | 382/264 |
| 2011/0097012 A1* | 4/2011 | Tatsumi | 382/274 |
| 2011/0102479 A1* | 5/2011 | Kitada et al. | 345/690 |
| 2011/0103708 A1* | 5/2011 | Tatsumi | 382/260 |
| 2011/0110602 A1* | 5/2011 | Hiraki et al. | 382/260 |
| 2011/0141350 A1* | 6/2011 | Ito et al. | 348/441 |
| 2011/0142290 A1* | 6/2011 | Aida et al. | 382/107 |

FOREIGN PATENT DOCUMENTS

| | | |
|---|---|---|
| JP | 2006-184896 A | 7/2006 |
| JP | 2009-271135 A | 11/2009 |

OTHER PUBLICATIONS

Han-Feng Chen, et al., "P-44: Smooth Frame Insertion Method for Motion Blur Reduction in LCDs", EuroDisplay 2005, Jan. 1, 2005, pp. 359-361.

Hanfeng Chen, et al., "33.4: Smooth Frame Method for Reducing Motion Blur on OLED Panel", SID 08 Digest, 2008 SID International Symposium, Society for Information Display, Los Angeles, USA, vol. XXXIX, May 18, 2008, pp. 472-475.

F.H. van Heesch, et al., "Spatio Temporal Frequency Analysis of Motion Blur Reduction on LCDs", Image Processing, ICIP 2007, IEEE International Conference on IEEE, PI, Sep. 1, 2007, pp. IV-401-IV-404.

* cited by examiner

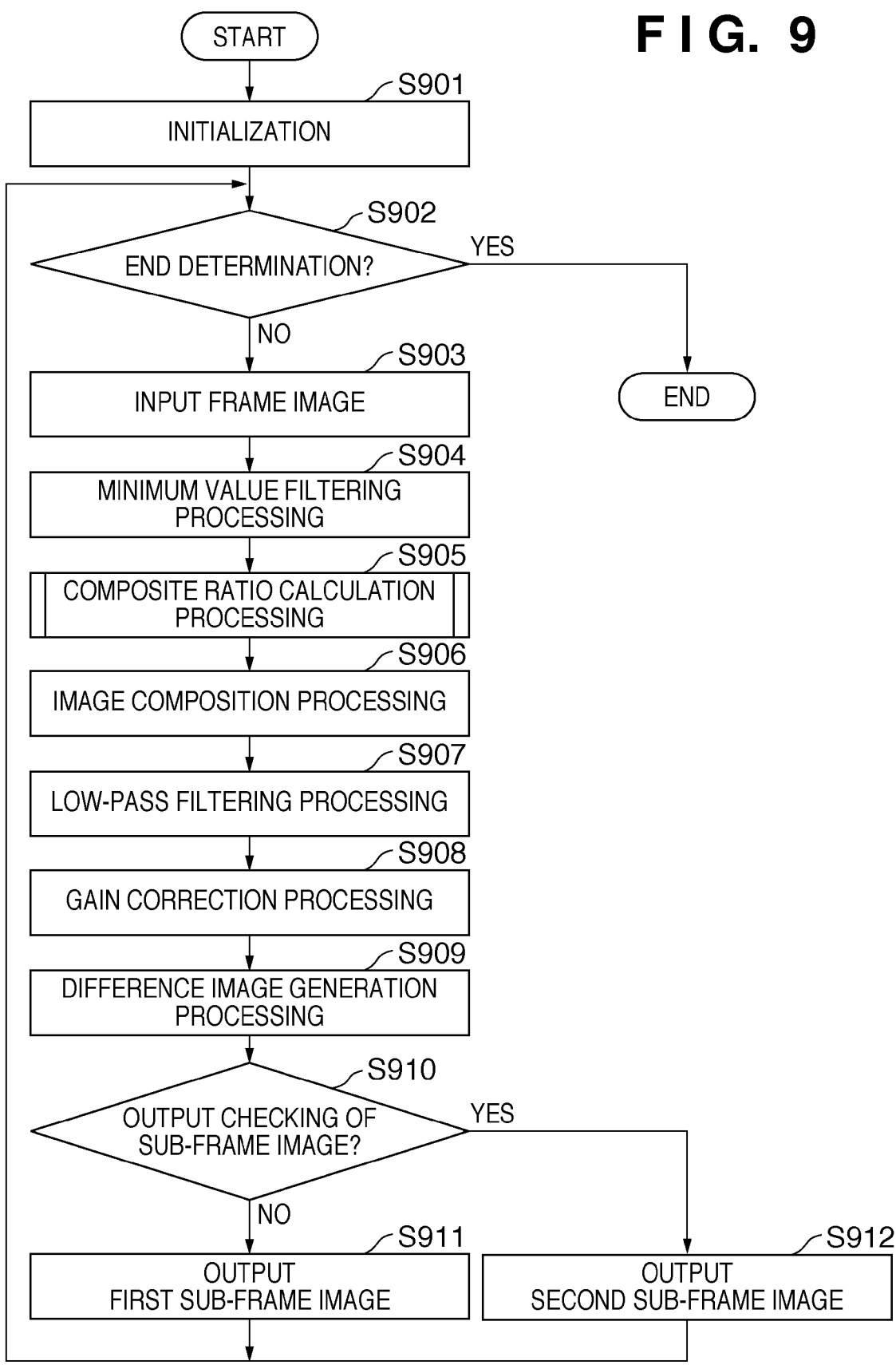

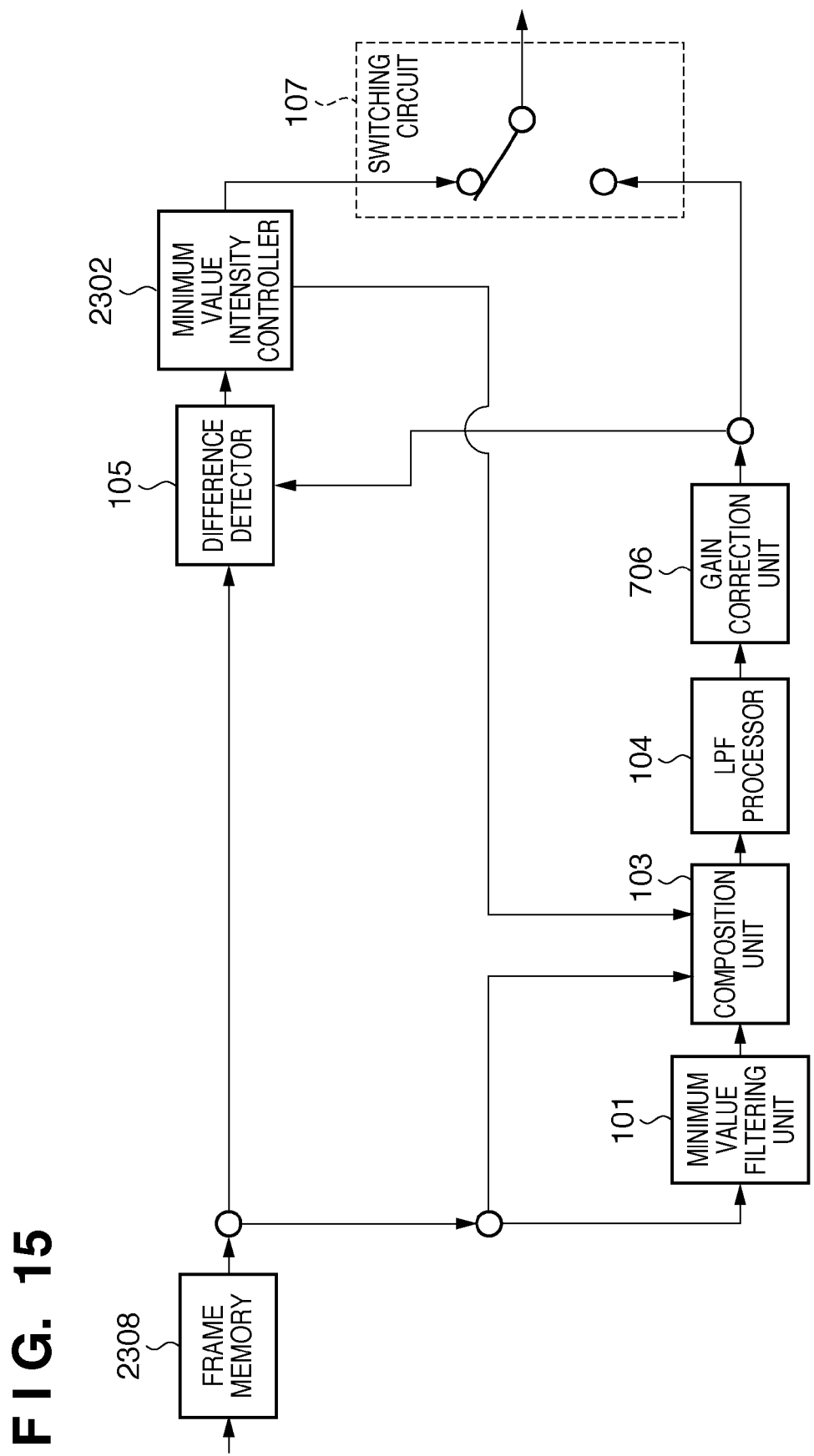

IMAGE PROCESSING APPARATUS AND IMAGE PROCESSING METHOD

BACKGROUND OF THE INVENTION

1. Field of the Invention

The present invention relates to moving image processing for frame rate conversion and, more particularly, to a conversion process for performing convertion to a higher frame rate, for example, converting a 60 Hz image into a 120 Hz image.

2. Description of the Related Art

As a movie display device represented by a television receiver, a display device using a liquid crystal device (hold type) and a field emission type display device (impulse type) are known.

As a driving method of these display devices, a method of distributing a frame image into two sub-frames based on frequency components to take a motion blur measure for a hold type display device or a flicker measure for an impulse type display device is known.

As an example of a method of realizing double-speed driving of the hold type display device, a technique disclosed in patent reference 1 (Japanese Patent Laid-Open No. 2006-184896) is known. FIG. 10 shows a part of the circuit arrangement disclosed by patent reference 1. An LPF (low-pass filter) processor 104 generates a sub-frame image including only low frequency components based on an input frame image.

A difference detector 105 extracts, as high frequency components, a difference between the input frame image and the sub-frame image, which is generated by the LPF processor 104 and includes only low frequency components. A subsequent adder 199 adds the high frequency component image extracted by the difference detector 105 and the input frame image, thus obtaining a sub-frame image, high frequency components of which are emphasized.

A switching circuit 107 switches the sub-frame image including only low frequency components and that whose high frequency components are emphasized at cycles of 120 Hz, and outputs the selected image to the subsequent stage. Alternate displaying of the sub-frame image from which high frequency components are excluded and that whose high frequency components are emphasized is equivalent to reproduction of an original frame image when viewed at a time cycle of 60 Hz.

However, a frame image, which is observed as if two images were composited by alternately displaying the two sub-frame images, does not often become the same as the original frame image. This point will be described below with reference to FIGS. 11A to 11F.

FIG. 11A shows a waveform example of an input frame image. FIG. 11B shows a waveform as a result of processing of this input frame image by the LPF processor 104. FIG. 11C shows a waveform of a frame image output from the difference detector 105 when the input frame image having the waveform shown in FIG. 11A and the frame image having the waveform shown in FIG. 11B are input to the difference detector 105. Since this frame image is an image of high frequency components, its waveform assumes positive and negative values. FIG. 11D shows a waveform of a frame image output from the adder 199 when the frame image having the waveform shown in FIG. 11C and that having the waveform shown in FIG. 11A are input to the adder 199.

Theoretically, by alternately displaying the waveforms shown in FIGS. 11B and 11C at cycles of 120 Hz, an apparent waveform becomes the same as that shown in FIG. 11A. However, when a low luminance level portion in the waveform shown in FIG. 11A assumes a value equal to or close to zero, the waveform shown in FIG. 11D assumes a negative value. Since an image of the negative value cannot be displayed, the negative value is displayed as zero in practice, as shown in FIG. 11E. Then, an apparent composite waveform becomes a waveform shown in FIG. 11F, since the frame image having the waveform shown in FIG. 11B and that having the waveform shown in FIG. 11E are alternately displayed. When the frame image having such waveform is, for example, an image on which white characters are laid out on a black background, that image is perceived as an image on which the edges of these characters are blurred. In this manner, depending on the waveform of an input frame image, an image after the distribution processing cannot be seen as the same image as an original image, and is perceived as a degraded image, thus posing a problem.

In order to solve this problem caused by negative values generated upon division of sub-frame images, in patent reference 2 (Japanese Patent Application No. 2008-119059), a minimum value filtering unit 101 is arranged in front of the LPF processor 104 to apply minimum value filtering processing to the interior of a region to be processed by the LPF processor 104, as shown in FIG. 12. FIGS. 13A to 13F show waveforms of frame images obtained in respective stages by the apparatus having the arrangement shown in FIG. 12.

FIG. 13A shows a waveform of an input frame image. When the minimum value filtering unit 101 applies minimum value filtering processing to this input frame image, a frame image having a waveform shown in FIG. 13B is generated. When the LPF processor 104 applies low-pass filtering processing to the frame image having the waveform shown in FIG. 13B, a frame image having a waveform shown in FIG. 13C is generated. The frame image having this waveform is characterized in that gradient start points match the edges of the frame image having the waveform shown in FIG. 13A, since gradient regions due to the edges are shifted by a half interval length to the high signal value region side by the minimum value filtering processing.

The difference detector 105 generates a frame image having a waveform shown in FIG. 13D by subtracting the frame image having the waveform shown in FIG. 13C from that having the waveform shown in FIG. 13A. Since the frame image having the waveform shown in FIG. 13C assumes values lower than that having the waveform shown in FIG. 13A in every signal regions due to the minimum value filtering processing, the frame image having the waveform shown in FIG. 13D always assumes positive values.

The adder 199 generates a frame image having a waveform shown in FIG. 13E by adding the frame image having the waveform shown in FIG. 13D to that having the waveform shown in FIG. 13A.

Upon display, the frame image having the waveform shown in FIG. 13E and that having the waveform shown in FIG. 13C are temporally alternately displayed as sub-frame images. As a result, a frame image having a waveform shown in FIG. 13F (apparent frame image) can match that having the waveform shown in FIG. 13A (input frame image). In this way, the minimum value filtering processing has a negative value generation suppression function at the time of sub-frame division, thereby improving image quality.

However, this negative value generation suppression function of the minimum value filtering processing suffers a performance issue. That is, since this function depends on a picture on an image and pixel values selected by the minimum value filtering processing are too low, gradient regions of pixel values in edge regions are unwantedly extended by the low-pass filtering processing.

This issue will be explained below with reference to FIGS. 6A and 6B. FIGS. 6A and 6B are graphs both showing image information as linear signal waveforms, the abscissa plots image coordinates, and the ordinate plots pixel values. FIG. 6A shows image information when minimum value filtering processing is used, and FIG. 6B shows image information when no minimum value filtering processing is used. Both the pieces of image information shown in FIGS. 6A and 6B include edges near an image coordinate=10.

As shown in FIGS. 6A and 6B, as for a signal (SL) including only low frequency components, the gradient regions of pixel values obtained using the minimum value filtering processing are broader than those without using the minimum value filtering processing. When a picture remains unchanged temporally, since an apparent frame image obtained by compositing the two sub-frame images becomes the same as an original frame image, this phenomenon does not pose any problem in term of image quality. However, when a picture changes temporally, the above phenomenon imposes an adverse effect in terms of image quality, and a viewer perceives the gradient regions of the pixel values of the signal SL as a ghost in a direction opposite to a motion of an edge area. However, since this adverse effect is a tradeoff from the negative value generation problem at the time of sub-frame image division, it is permitted for negative value generation suppression.

A problem is that a minimum value of a signal including high frequency components (SH) assumes a value larger than zero when sub-frame image division is made using the minimum value filtering processing. Since the broader gradient regions of pixel values of the signal SL are a tradeoff from the negative value generation problem, the minimum value of the signal SH need not be larger than zero, and is most desirably set to be zero to minimize the gradient regions of pixel values of the signal SL if it is possible. However, it is difficult for the method and arrangement disclosed by patent reference 2 to implement it since patent reference 2 discloses only a function of selecting a minimum value of pixels in an interval.

SUMMARY OF THE INVENTION

The present invention has been made in consideration of the aforementioned problems, and provides a technique for eliminating image quality deterioration by minimizing a ghost when an image for one frame is divided into sub-frame images using minimum value filtering processing.

According to the first aspect of the present invention, an image processing apparatus, which converts a frame rate by dividing an input frame into subframes and outputting the subframes, comprises: a preprocessing unit that performs preprocessing of replacing a pixel value of a pixel of interest with a minimum pixel value of peripheral pixels of the pixel of interest in an input frame; a composition unit comprising a composition generating unit that generates a composite image by performing a composition process on the input frame and the input frame having undergone the preprocessing, according to a composite ratio (a); a low-pass filter processing unit that generates a first subframe by performing a lowpass filtering process on the composite image; a generating unit that generates a second subframe from the first subframe and the input frame; and a switching unit that outputs the first subframe and the second subframe by switching the first subframe and the second subframe at a predetermined timing.

According to the second aspect of the present invention, an image processing method for an image processing apparatus which converts a frame rate by dividing an input frame into subframes and outputting the subframes, comprises: a preprocessing step for performing preprocessing of replacing a pixel value of a pixel of interest with a minimum pixel value of peripheral pixels of the pixel of interest in an input frame; a composition step for generating a composite image by performing a composition process on the input frame and the input frame having undergone the preprocessing, according to a composite ratio (a); a low-pass filter processing step for generating a first subframe by performing a lowpass filtering process on the composited image; a generating step for generating a second subframe from the first subframe and the input frame; and a switching step for outputting the first subframe and the second subframe by switching the first subframe and the second subframe at a predetermined timing.

Further features of the present invention will become apparent from the following description of exemplary embodiments with reference to the attached drawings.

BRIEF DESCRIPTION OF THE DRAWINGS

FIG. 9 is a flowchart of processing performed by the image processing apparatus according to the second embodiment;

FIG. 15 is a block diagram showing an example of the functional arrangement of an image processing apparatus according to the fourth embodiment.

DESCRIPTION OF THE EMBODIMENTS

Embodiments of the present invention will be described hereinafter with reference to the accompanying drawings. Note that embodiments to be explained hereinafter show examples upon practicing the present invention, and are those of practical embodiments of the arrangements described in the scope of claims.

First Embodiment

Figure 1:
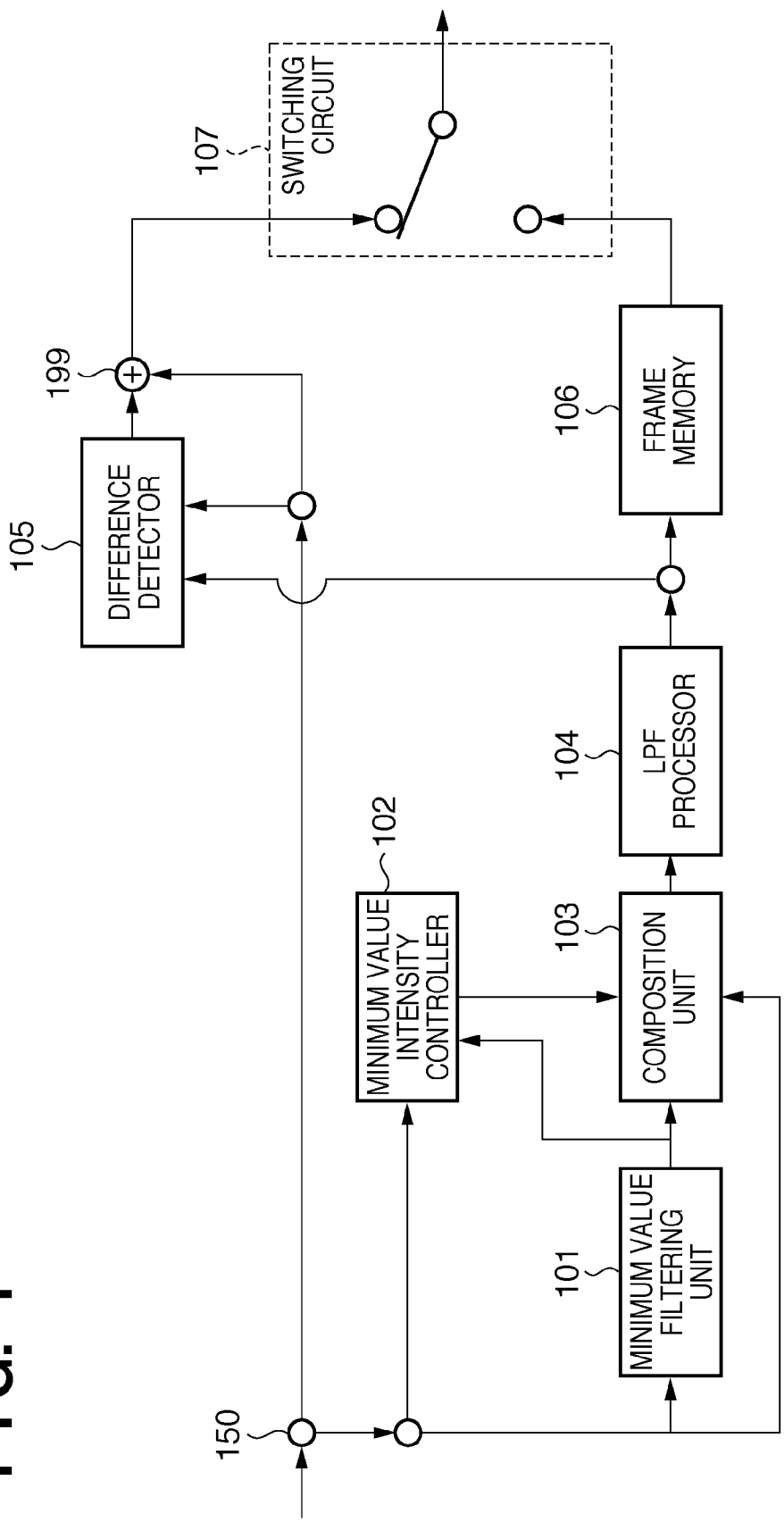
FIG. 1 is a block diagram showing an example of the functional arrangement of an image processing apparatus according to the first embodiment.

This embodiment will explain an image processing apparatus as a hold type display device. FIG. 1 is a block diagram showing an example of the functional arrangement of an image processing apparatus according to this embodiment. As shown in FIG. 1, the image processing apparatus according to this embodiment includes an input terminal 150, minimum value filtering unit 101, minimum value intensity controller 102, composition unit 103, LPF processor 104, frame memory 106, difference detector 105, adder 199, and switching circuit 107.

To the input terminal 150, images of respective frames (frame images) that configure a movie are sequentially input. Operations of the respective units when a frame image of interest is input to the input terminal 150 will be described below. That is, the operations of the respective units to be described below are executed for each frame image.

The frame image of interest input via the input terminal 150 is input to the difference detector 105, adder 199, minimum value intensity controller 102, minimum value filtering unit 101, and composition unit 103.

The minimum value filtering unit 101 generates a processed image by applying minimum value filtering processing to the frame image of interest, and outputs the generated processed image to the minimum value intensity controller 102 and the composition unit 103.

As is well known, the minimum value filtering processing is to apply the following processing to each pixel which configure an image. That is, upon processing a pixel P, pixel values of a total of nine pixels, in other words, eight pixels that surround this pixel P and the pixel P are referred to, and a minimum pixel value is specified. Then, the pixel value of the pixel P is updated by the specified minimum pixel value. Therefore, by applying this processing to respective pixels that configure an image, the minimum value filtering processing can be applied to this image to generate a processed image.

Figure 2A:
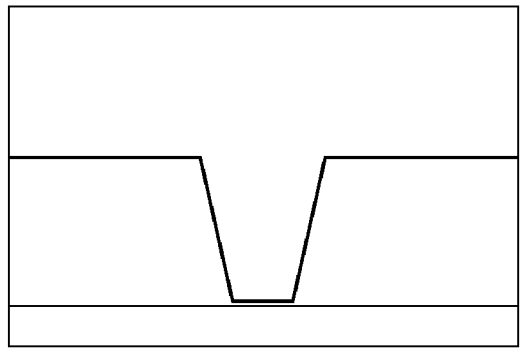
FIGS. 2A to 2F are graphs showing waveforms of frame images obtained in respective stages in image processing according to the first embodiment.
Figure 2D:
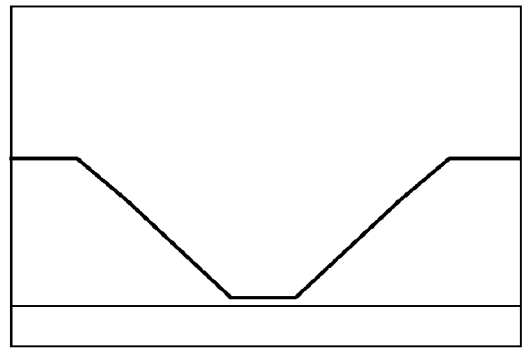
Figure 2B:
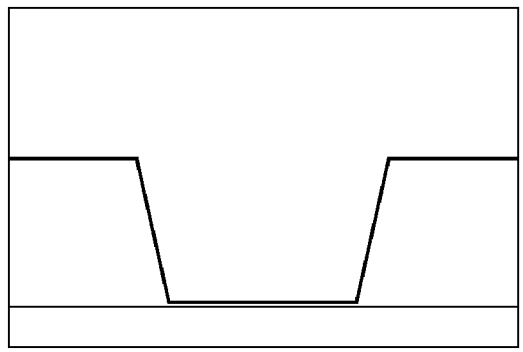

FIGS. 2A to 2F are graphs showing waveforms of frame images obtained in respective stages in image processing according to this embodiment, the abscissa plots image coordinates, and the ordinate plots pixel values. FIG. 2A shows a waveform of the frame image of interest, and FIG. 2B shows a waveform of the processed image as the processing result of the minimum value filtering unit 101 when the frame image of interest having the waveform shown in FIG. 2A is input to the minimum value filtering unit 101. With the minimum value filtering processing, since a pixel value in an edge region where high- and low-luminance pixel values are located at neighboring positions is updated to a low-luminance pixel value, the edge is shifted to a high-luminance region by a half length of a block.

The composition unit 103 generates a composite image by compositing the frame image of interest received from the input terminal 150 and the processed image received from the minimum value filtering unit 101 according to a composite ratio a. That is, letting M be a processed image, A be a frame image of interest, and C be a composite image, the composition unit 103 generates the composite image C according to:

$$C = a \times M + (1-a) \times A$$

Figure 2E:
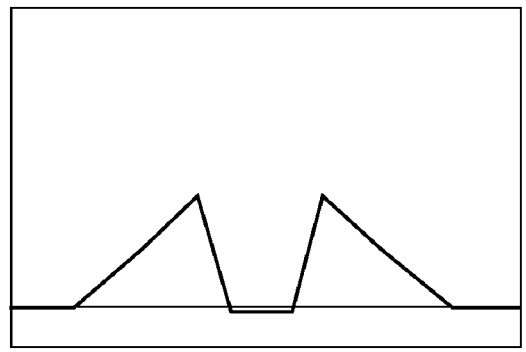
Figure 2C:
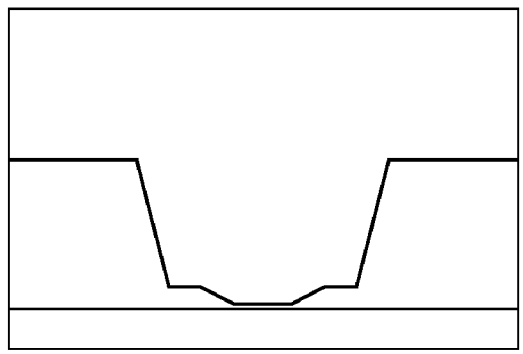
Figure 2F:
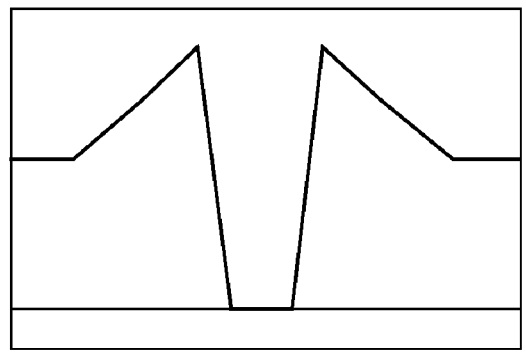

This equation means that an image which has, as each pixel value, a sum of a product of a pixel value of each pixel that configures the processed image M by a and that of a pixel value of each pixel that configures the frame image A of interest by (1−a) is generated as the composite image C. FIG. 2C shows a waveform of the composite image C.

The minimum value intensity controller 102 acquires the frame image A of interest received from the input terminal 150 and the processed image M received from the minimum value filtering unit 101, and executes processing for calculating the composite ratio a using these images. That is, the minimum value intensity controller 102 determines the composite ratio a prior to the composition processing in the composition unit 103, and outputs the determined composite ratio a to the composition unit 103. Thus, the composition unit 103 executes the composition processing using the composite ratio a input from the minimum value intensity controller 102. Details of the minimum value intensity controller 102 will be described later.

Next, the LPF processor 104 generates an image configured by low frequency components (including only low frequency components) (low frequency component image) by applying two-dimensional low-pass filtering processing to the composite image C generated by the composition unit 103. Note that a function of the low-pass filter is not particularly limited, and may use a Gaussian function or a moving average or weighted moving average filter.

FIG. 2D shows a waveform of the low frequency component image. The low frequency component image output from the LPF processor 104 is stored in the frame memory 106, and is also output to the difference detector 105.

The difference detector 105 generates a difference image by subtracting the low frequency component image input from the LPF processor 104 from the frame image A of interest input from the input terminal 150. In the examples of FIGS. 2A to 2F, a result obtained by subtracting the low frequency component image having the waveform shown in FIG. 2D from the frame image of interest having the waveform shown in FIG. 2A is the difference image having the waveform shown in FIG. 2E. The difference detector 105 outputs the calculated difference image to the subsequent adder 199.

The adder 199 generates a high frequency component image configured by high frequency components (high frequency components of which are emphasized) by compositing the difference image received from the difference detector 105 and the frame image A of interest received from the input terminal 150. In the examples of FIGS. 2A to 2F, a result obtained by compositing the frame image of interest having the waveform shown in FIG. 2A and the difference image having the waveform shown in FIG. 2E is the high frequency component image having a waveform shown in FIG. 2F. Then, the adder 199 outputs the high frequency component image to the subsequent switching circuit 107.

The switching circuit 107 alternately reads out the high frequency component image output from the adder 199 and the low frequency component image stored in the frame memory 106, and displays the readout image. In this way, when respective frame images are input to the input terminal 150 at, for example, 60 Hz, the switching circuit 107 displays images (the high and low frequency component images alternately) at 120 Hz. Note that images read out by the switching circuit 107 may be used in purposes other than display, and may be output to, for example, a memory.

Then, the user can visually perceive the images displayed by the switching circuit 107 to have the same waveform as that (which is shown in FIG. 2A) of the frame image displayed at 60 Hz.

Note that when each pixel of an image is configured by a plurality of color elements like R, G, and B, the aforementioned processing can be performed for each color elements. The color elements are not limited to R, G, and B, but they may be Y, Cb, and Cr. Also, the above processing may be applied to only Y. Furthermore, Y may be calculated from R, G, and B, the above processing may be performed for the calculated Y, and the processing result may be applied to R, G, and B.

Figure 5:
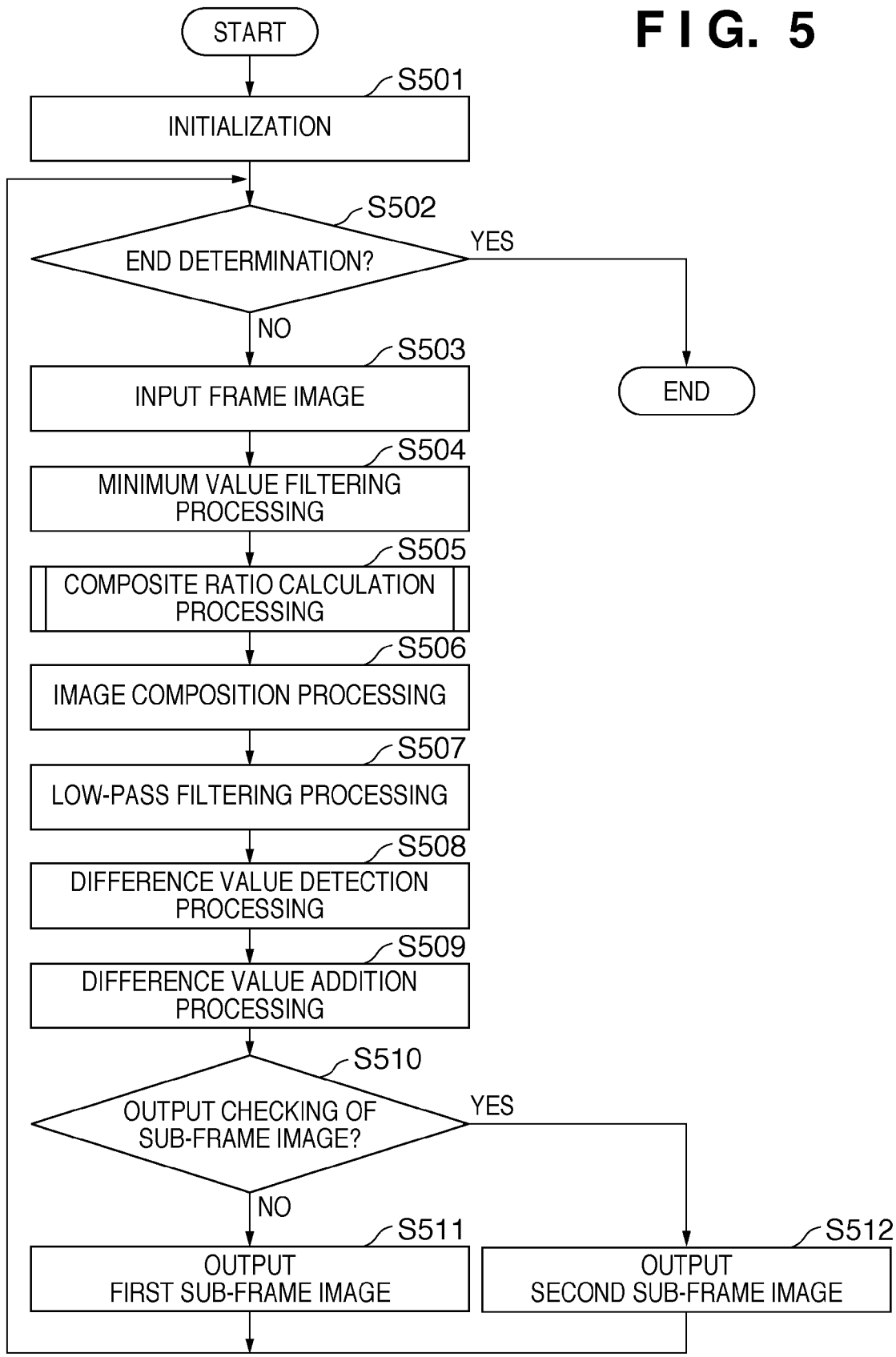
FIG. 5 is a flowchart of processing performed by the image processing apparatus according to the first embodiment.
Figure 6A:
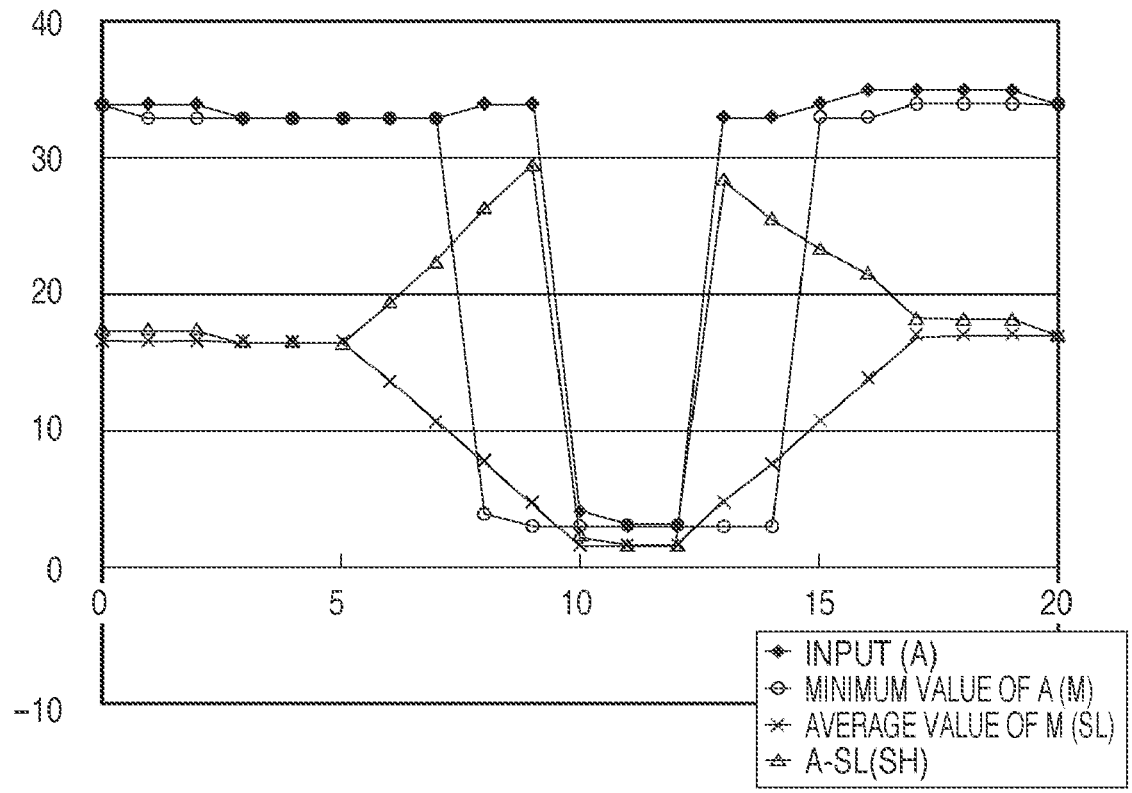
FIGS. 6A and 6B are graphs showing image information as linear signal waveforms.
Figure 6B:
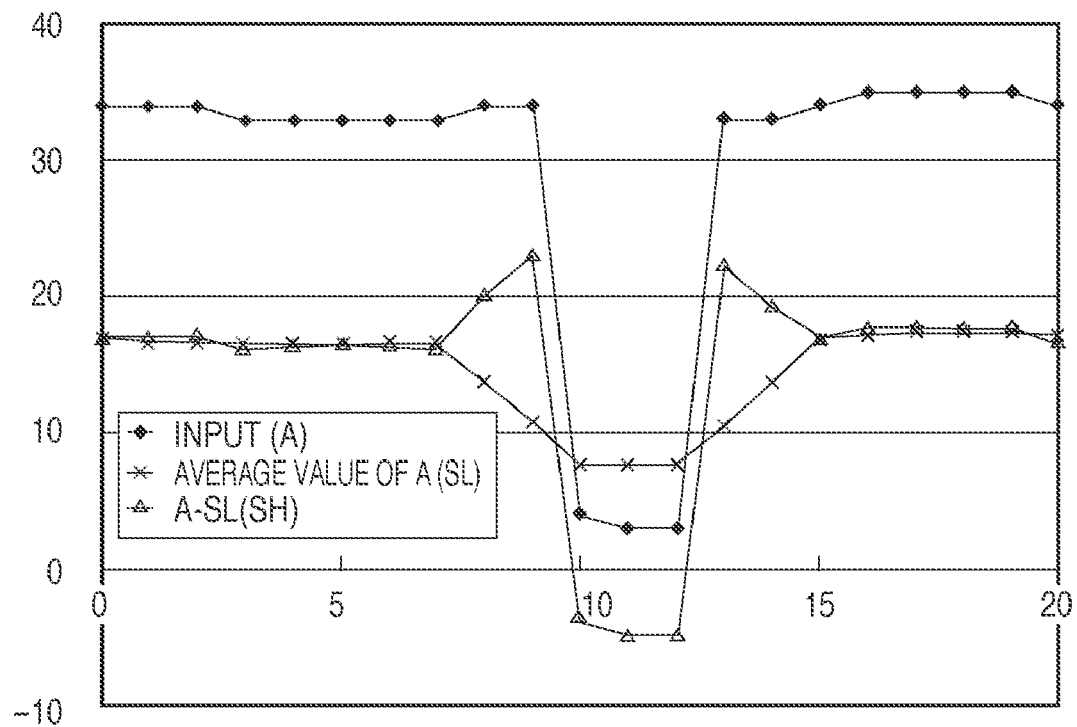

FIG. 5 is a flowchart of processing performed by the image processing apparatus according to this embodiment. In step S501, a controller (not shown) of the image processing apparatus initializes variables, parameters, and the like used in respective processes to be described below. For example, the controller initializes a size of a minimum value filter used in the minimum value filtering unit 101 and the static property of the low-pass filter used in the LPF processor 104.

The controller checks in step S502 whether or not to end this processing. Various conditions for ending this processing are available. However, since these conditions are not important in this embodiment, a description thereof will not be given. As a result of this checking, if the processing is to end, the controller executes a process for ending this processing; otherwise, the process advances to step S503.

In step S503, the input terminal 150 acquires a frame image A of interest, and outputs it to the difference detector 105, adder 199, minimum value intensity controller 102, minimum value filtering unit 101, and composition unit 103.

In step S504, the minimum value filtering unit 101 generates a processed image M by applying the minimum value filtering processing to the frame image A of interest input from the input terminal 150, and outputs the generated processed image M to the minimum value intensity controller 102 and composition unit 103.

In step S505, the minimum value intensity controller 102 acquires the frame image A of interest received from the input terminal 150 and the processed image M received from the minimum value filtering unit 101, and executes a process for calculating the composite ratio a using these images.

Figure 3:
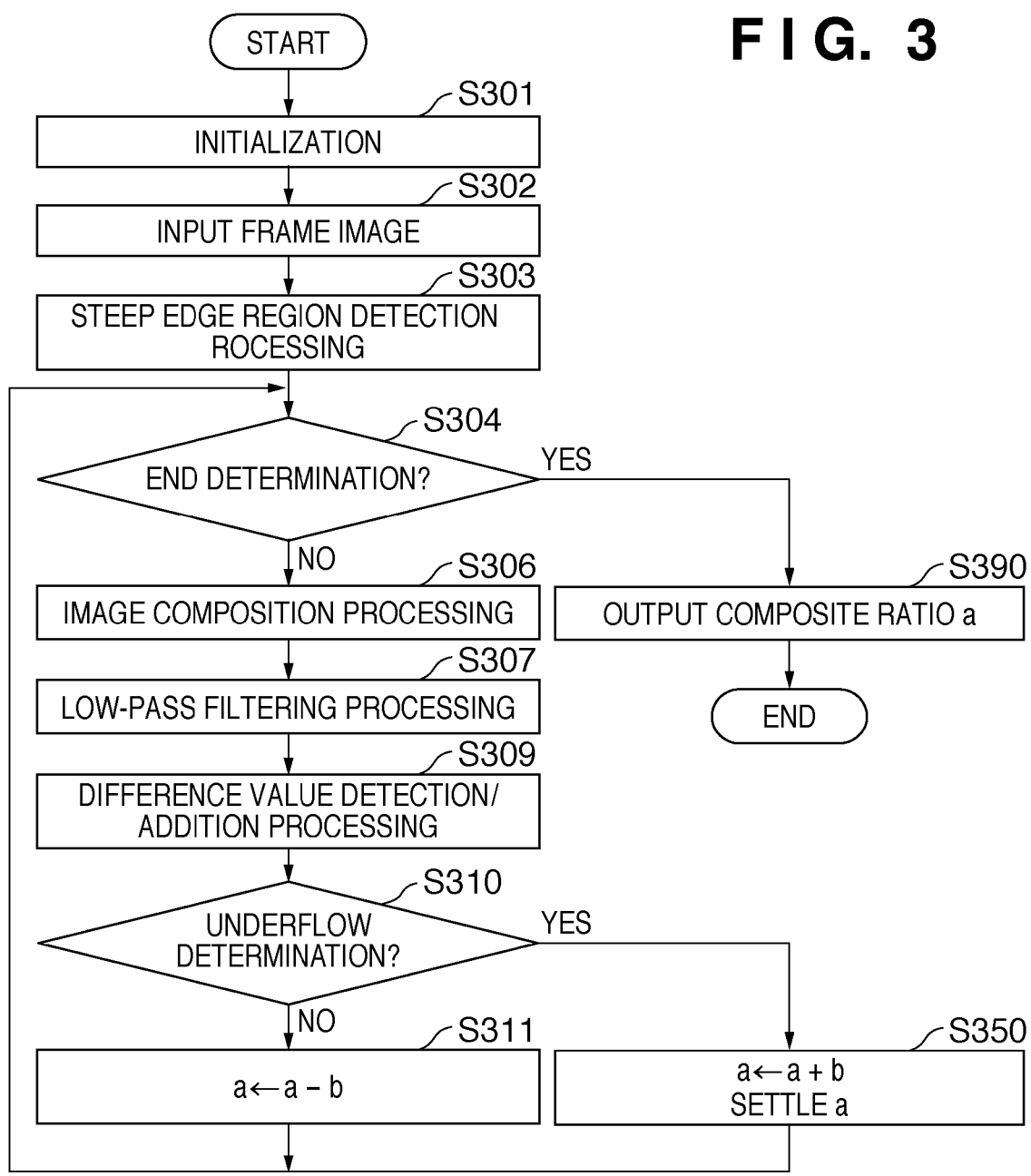
FIG. 3 is a flowchart showing details of processing in step S505.

Details of the process in step S505 will be described below with reference to the flowchart shown in FIG. 3. FIG. 3 is a flowchart showing details of the process in step S505. Note that a main body of the process according to the flowchart shown in FIG. 3 is the minimum value intensity controller 102, as a matter of course.

In step S301, the minimum value intensity controller 102 executes an initialization process of parameters and the like used in the following processes. For example, the minimum value intensity controller 102 sets predetermined values in thresholds th01 and th02, and initializes the composite ratio a to "1.0".

In step S302, the minimum value intensity controller 102 acquires the frame image A of interest from the input terminal 150. In step S303, the minimum value intensity controller 102 detects, from the frame image A of interest, an edge region (steep edge region) where negative pixel values are most readily assumed in a composite image C obtained by compositing the processed image M and frame image A of interest by the composition unit 103.

The control encounters one of the following cases according to the contents in the frame image A of interest: only one steep edge region can be specified; a plurality of steep edge regions are specified; and no steep edge region is specified. Only one steep edge region can be specified when one edge region in which a contrast change ratio is equal to or larger than a threshold is specified in the frame image of interest by the following two processes.

(Process 1) Edge regions where a contrast change ratio in each edge region is equal to or larger than a threshold (threshold th01) of one or more edge regions detected from the frame image A of interest are specified.

(Process 2) Edge regions in which a lowest contrast value in each edge region is equal to or larger than a threshold (threshold th02) of those specified by (process 1) are specified. Then, an edge region with the smallest lowest contrast value of the specified edge regions is specified as a steep edge region.

Figure 4:
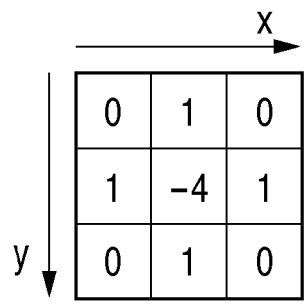
FIG. 4 is a view showing an example of the configuration of a Laplacian filter.

Note that various edge region detection techniques may be applied. For example, edge detection may be implemented using a Laplacian filter exemplified in FIG. 4. In order to calculate a contrast change ratio, various methods can be applied. For example, a sum total of output results using the Laplacian filter may be used.

A plurality of steep edge regions are specified when a plurality of edge regions are specified as the processing result of (process 1) and (process 2) above. However, since the same subsequent processes are applied even when any of the plurality of edge regions is used, any one of the plurality of edge regions can be appropriately selected as a steep edge region in this case.

No steep edge region is specified when no edge region is specified as the processing result of (process 1) and (process 2) above. In this case, an image quality difference of images as results is very small independently of values set as the composite ratio a, and its effect is low.

The minimum value intensity controller 102 checks in step S304 if no steep edge is specified in step S303, the composite ratio a is determined, and the composite ratio a becomes 0.0 ($\pm\epsilon\ll 0$). As a result of this checking, if one of these conditions is satisfied, the process advances to step S390. On the other hand, if none of these conditions are satisfied, the process advances to step S306.

In step S390, the minimum value intensity controller 102 outputs the composite ratio a at this time to the composition unit 103. In step S306, the controller 102 composites an image in the steep edge region (first image) in the frame image A of interest from the input terminal 150 and an image in a region corresponding to the steep edge region (second image) in the processed image M from the minimum value filtering unit 101 at the composite ratio a. This composition processing (first unit) is the substantially same as that described above to be executed by the composition unit 103, except for that between the steep edge regions in place of images. According to this processing, the composition processing can be speeded up compared to that of the entire images.

In step S307, the minimum value intensity controller 102 generates an image configured by low frequency components (including only low frequency components) (low frequency component partial image) by applying two-dimensional low-pass filtering processing to a partial composite image generated by the composition processing in step S306 (second unit).

In step S309, the minimum value intensity controller 102 generates a difference image by subtracting the low frequency component partial image generated in step S307 from the image in the steep edge region (first image) in the frame image A of interest input from the input terminal 150. Then, the minimum value intensity controller 102 generates a high frequency component partial image configured by high frequency components (high frequency components of which are emphasized) by compositing this difference image and the image in the steep edge region (first image) in the frame image A of interest received from the input terminal 150 (third unit).

The minimum value intensity controller 102 checks in step S310 with reference to respective pixel values that configure the high frequency component partial image generated in step S309 whether or not all the pixel values that configure the high frequency component partial image are equal to or larger than zero. That is, the minimum value intensity controller 102 checks if an underflow occurs. As a result of checking, if the pixels that configure the high frequency component partial image include those whose pixel values are smaller than zero, the process advances to step S350. On the other hand, if the pixel values of all pixels that configure the high frequency component partial image are equal to or larger than zero, the process advances to step S311.

In step S350, the minimum value intensity controller 102 updates the composite ratio a by adding a predetermined value b ($0 < b \leq 1$) to the value of the composite ratio a. Then, the minimum value intensity controller 102 settles the updated composite ratio a as a final result. On the other hand, in step S311 the minimum value intensity controller 102 updates the composite ratio a by subtracting the predetermined value b from the value of the composite ratio a. Then, after the process in step S311 or S350, the process returns to step S304.

Note that the process for computing (calculating) the composite ratio a is an example, and the composite ratio a may be calculated by other methods as long as the same object can be achieved. That is, the composite ratio a may be calculated using other methods as long as a minimum composite ratio a can be calculated so that all pixel values that configure the region in the high-frequency component image corresponding to the steep edge region in the composite image become equal to or larger than zero.

Referring back to FIG. 5, in step S506 the composition unit 103 generates the composite image C by compositing the frame image A of interest received from the input terminal 150 and the processed image M received from the minimum value filtering unit 101 according to the composite ratio a calculated in step S505.

In step S507, the LPF processor 104 generates an image configured by low frequency components (including only low frequency components) (low frequency component image) by applying two-dimensional low-pass filtering processing to the composite image C generated by the composition unit 103. The generated low frequency component image is stored in the frame memory 106, and is also output to the difference detector 105.

In step S508, the difference detector 105 generates a difference image by subtracting the low frequency component image input from the LPF processor 104 from the frame image A of interest input from the input terminal 150. The difference detector 105 outputs the calculated difference image to the subsequent adder 199. The adder 199 generates a high frequency component image configured by high frequency components (high frequency components of which are emphasized) by compositing the difference image received from the difference detector 105 and the frame image A of interest received from the input terminal 150. Then, the adder 199 outputs the high frequency component image to the subsequent switching circuit 107.

The switching circuit 107 checks in step S510 which of the high frequency component image (second sub-frame image) and low frequency component image (first sub-frame image) is to be displayed at the current display timing. As described above, since the switching circuit 107 alternately displays the first and second sub-frame images at, for example, 120 Hz, it checks which of the sub-frame images is to be displayed at the current timing. If the first sub-frame image is to be displayed, the process advances to step S511; if the second sub-frame image is to be displayed, the process advances to step S512.

In step S511, the switching circuit 107 displays the low frequency component image as the first sub-frame image. In step S512, the switching circuit 107 displays the high frequency component image as the second sub-frame image.

That is, the switching circuit 107 sequentially outputs the high and low frequency component images in place of the frame image A of interest, thus achieving double-speed display. In case of the hold type display device, the first sub-frame image is displayed during the first $1/120$ sec, and the second sub-frame image is displayed during the next $1/120$ sec.

Note that the sub-frame image can be displayed for a time shorter than $1/120$ sec by improving the response property of liquid crystal or a method of controlling a backlight. However, the characteristic feature of this embodiment, in other words, generation of apparently the same waveform as the input waveform at time cycles of $1/60$ sec remains unchanged.

As described above, according to this embodiment, even when driving distribution processing (double-speed display) is executed using the minimum value filter, image quality deterioration can be eliminated by minimizing a ghost when a picture is moving.

Second Embodiment

Figure 7:
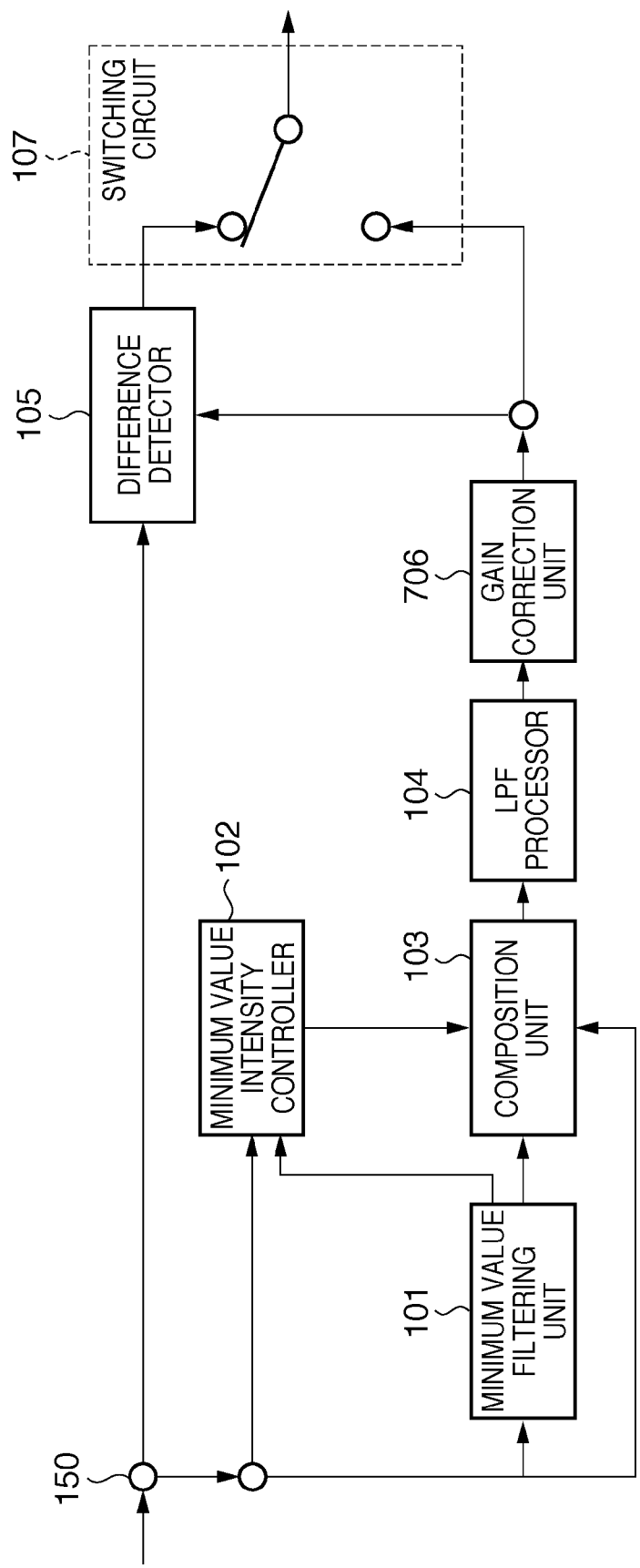
FIG. 7 is a block diagram showing an example of the functional arrangement of an image processing apparatus according to the second embodiment.

This embodiment will explain an image processing apparatus as an impulse type display device. FIG. 7 is a block diagram showing an example of the functional arrangement of the image processing apparatus according to this embodiment. Note that the same reference numerals in FIG. 7 denote the same components as in FIG. 1. Also, points which are not particularly described in this embodiment are the same as or similar to the first embodiment. A frame image of interest input via an input terminal 150 is input to a difference detector 105, minimum value intensity controller 102, minimum value filtering unit 101, and composition unit 103.

The minimum value filtering unit 101 generates a processed image by applying the same minimum value filtering processing as in the first embodiment to the frame image of interest, and outputs the generated processed image to the minimum value intensity controller 102 and the composition unit 103.

Figure 8A:
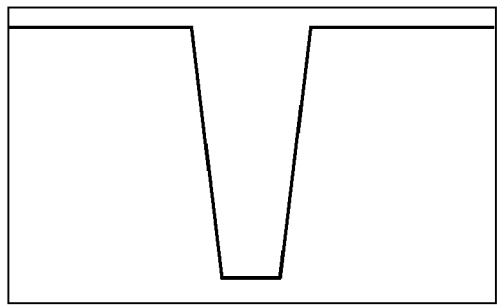
FIGS. 8A to 8F are graphs showing waveforms of frame images obtained in respective stages in image processing according to the second embodiment.
Figure 8D:
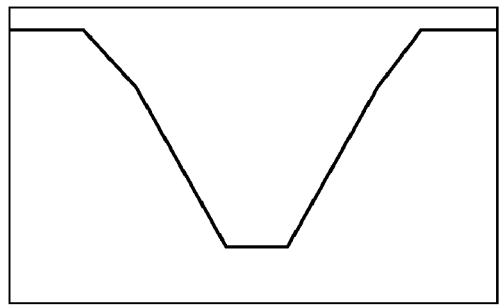
Figure 8B:
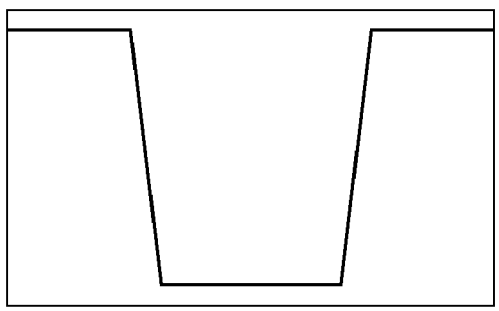

FIGS. 8A to 8F are graphs showing waveforms of frame images obtained in respective stages in image processing according to this embodiment, the abscissa plots image coordinates, and the ordinate plots pixel values. FIG. 8A shows a waveform of the frame image of interest, and FIG. 8B shows a waveform of the processed image as the processing result of the minimum value filtering unit 101 when the frame image of interest having the waveform shown in FIG. 8A is input to the minimum value filtering unit 101. With the minimum value filtering processing, since a pixel value in an edge region where high- and low-luminance pixel values are located at neighboring positions is updated to a low-luminance pixel value, the edge is shifted to a high-luminance region by a half length of a block.

Figure 8E:
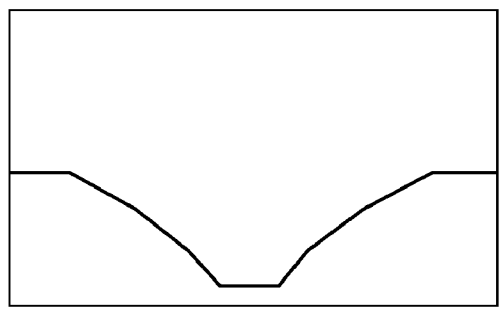
Figure 8C:
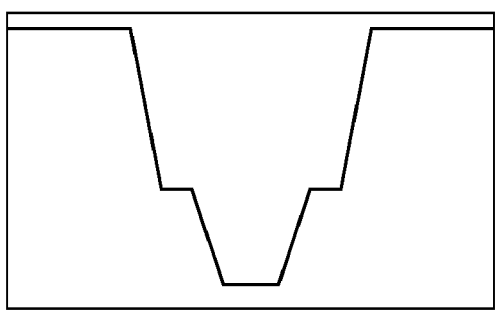

The composition unit 103 generates a composite image by compositing the frame image of interest received from the input terminal 150 and the processed image received from the minimum value filtering unit 101 according to a composite ratio a. This composition processing is as described in the first embodiment. FIG. 8C shows a waveform of the composite image.

The minimum value intensity controller 102 acquires the frame image of interest received from the input terminal 150 and the processed image received from the minimum value filtering unit 101, and executes processing for calculating the composite ratio a using these images. In this embodiment, the operation of the minimum value intensity controller 102 is slightly different from the first embodiment.

The minimum value intensity controller 102 executes an initialization process of parameters and the like used in the following processes. For example, the minimum value intensity controller 102 sets predetermined values in thresholds th01 and th02, and initializes the composite ratio a to "1.0".

The minimum value intensity controller 102 acquires the frame image of interest from the input terminal 150, and acquires the steep edge region from this frame image of interest as in the first embodiment.

The minimum value intensity controller 102 then checks if no steep edge is specified, the composite ratio a is determined, and the composite ratio a becomes $0.0$ ($\pm\epsilon<<0$). If one of these conditions is satisfied, the minimum value intensity controller 102 outputs the composite ratio a at this time to the composition unit 103. On the other hand, if none of the conditions are satisfied, the minimum value intensity controller 102 composites an image in the steep edge region in the frame image of interest from the input terminal 150 and an image in a region corresponding to the steep edge region in the processed image from the minimum value filtering unit 101 at the composite ratio a.

The minimum value intensity controller 102 generates an image configured by low frequency components (including only low frequency components) (low frequency component partial image) by applying two-dimensional low-pass filtering processing to a partial composite image generated by this composition processing.

The minimum value intensity controller 102 then lowers luminance values of pixels that configure this low frequency component partial image (for example, lowers them by 50%) to update this low frequency component partial image. The minimum value intensity controller 102 then generates a difference image by subtracting the updated low frequency component partial image from the image in the steep edge region in the frame image of interest input from the input terminal 150.

The minimum value intensity controller 102 then checks with reference to respective pixel values that configure this difference image whether or not all the pixel values that configure the difference image are equal to or larger than zero. That is, the minimum value intensity controller 102 checks if an underflow occurs. As a result of checking, if the pixels that configure the difference image include those whose pixel values are smaller than zero, the minimum value intensity controller 102 updates the composite ratio a by adding a predetermined value b ($0<b\leq 1$) to the value of the composite ratio a. Then, the minimum value intensity controller 102 settles the updated composite ratio a as a final result. On the other hand, if the pixel values of all pixels that configure the difference image are equal to or larger than zero, the minimum value intensity controller 102 updates the composite ratio a by subtracting the predetermined value b from the value of the composite ratio a. Then, the minimum value intensity controller 102 repeats the subsequent processes for generating the partial composite image using the updated composite ratio a unless the composite ratio a is settled. Thus, the minimum value intensity controller 102 settles the composite ratio a.

Of course, in this embodiment as well, the process for calculating the composite ratio a is an example, and the composite ratio a may be calculated by other methods as long as the same object can be achieved.

Then, the minimum value intensity controller 102 sets the composite ratio a settled in this way in the composition unit 103 as in the first embodiment. Next, the LPF processor 104 generates an image configured by low frequency components (including only low frequency components) (low frequency component image) by applying two-dimensional low-pass filtering processing to the composite image generated by the composition unit 103. Note that a function of the low-pass filter is not particularly limited, and may use a Gaussian function or a moving average or weighted moving average filter.

FIG. 8D shows a waveform of the low frequency component image. The low frequency component image output from the LPF processor 104 is output to a gain correction unit 706. The gain correction unit 706 updates this low frequency component image output from the LPF processor 104 by applying gain correction processing to this low frequency component image by lowering luminance values of respective pixels that configure the low frequency component image (for example, lowering them by 50%). FIG. 8E shows a waveform of an image obtained by multiplying pixel values of respective pixels that configure the low frequency component images having the waveform shown in FIG. 8D by 0.5. Note that the updated low frequency component image obtained by the gain correction unit 706 is often called a first sub-frame image. The gain correction unit 706 outputs the calculated first sub-frame image to a subsequent switching circuit 107.

Figure 8F:
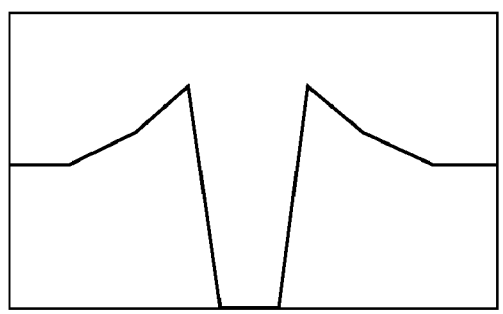
Figure 10:
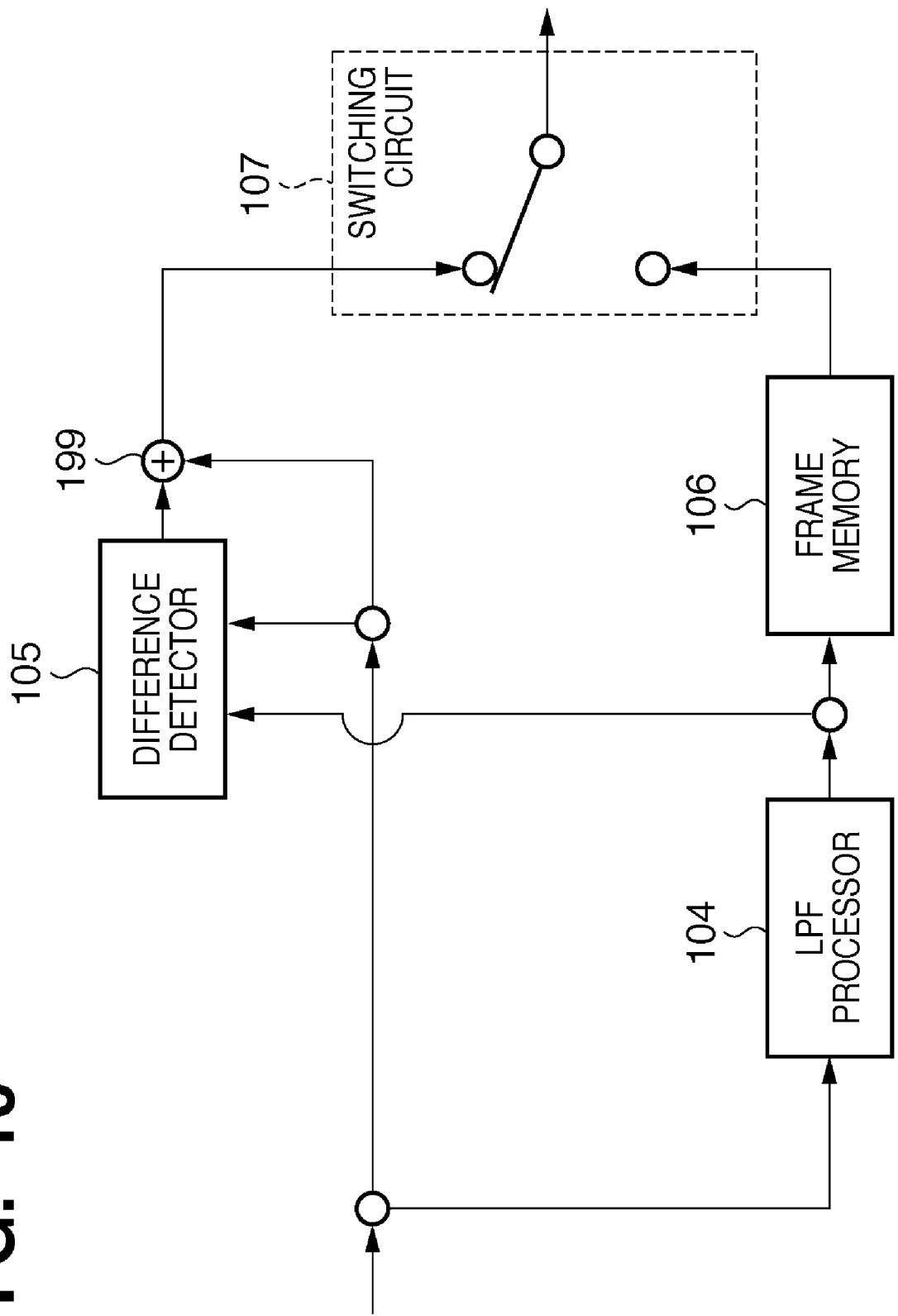
FIG. 10 is a block diagram showing a part of the circuit arrangement disclosed in patent reference 1.
Figure 11A:
FIGS. 11A to 11F are graphs for explaining a case in which a frame image which is observed as if two sub-frame images were composited by alternately displaying these two images does not become the same as an original frame image.
Figure 11D:
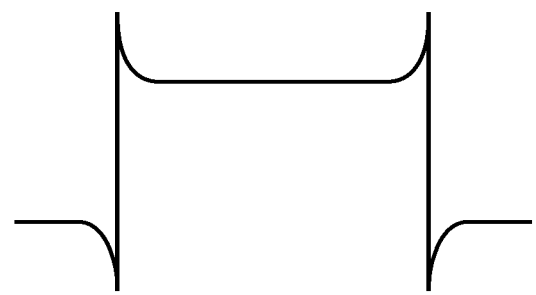
Figure 11B:
Figure 11E:
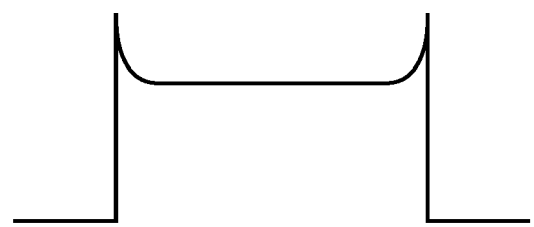
Figure 11C:
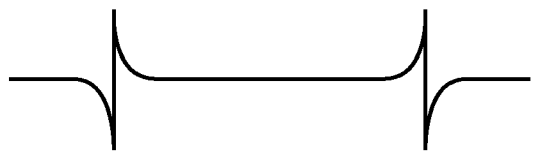
Figure 11F:
Figure 12:
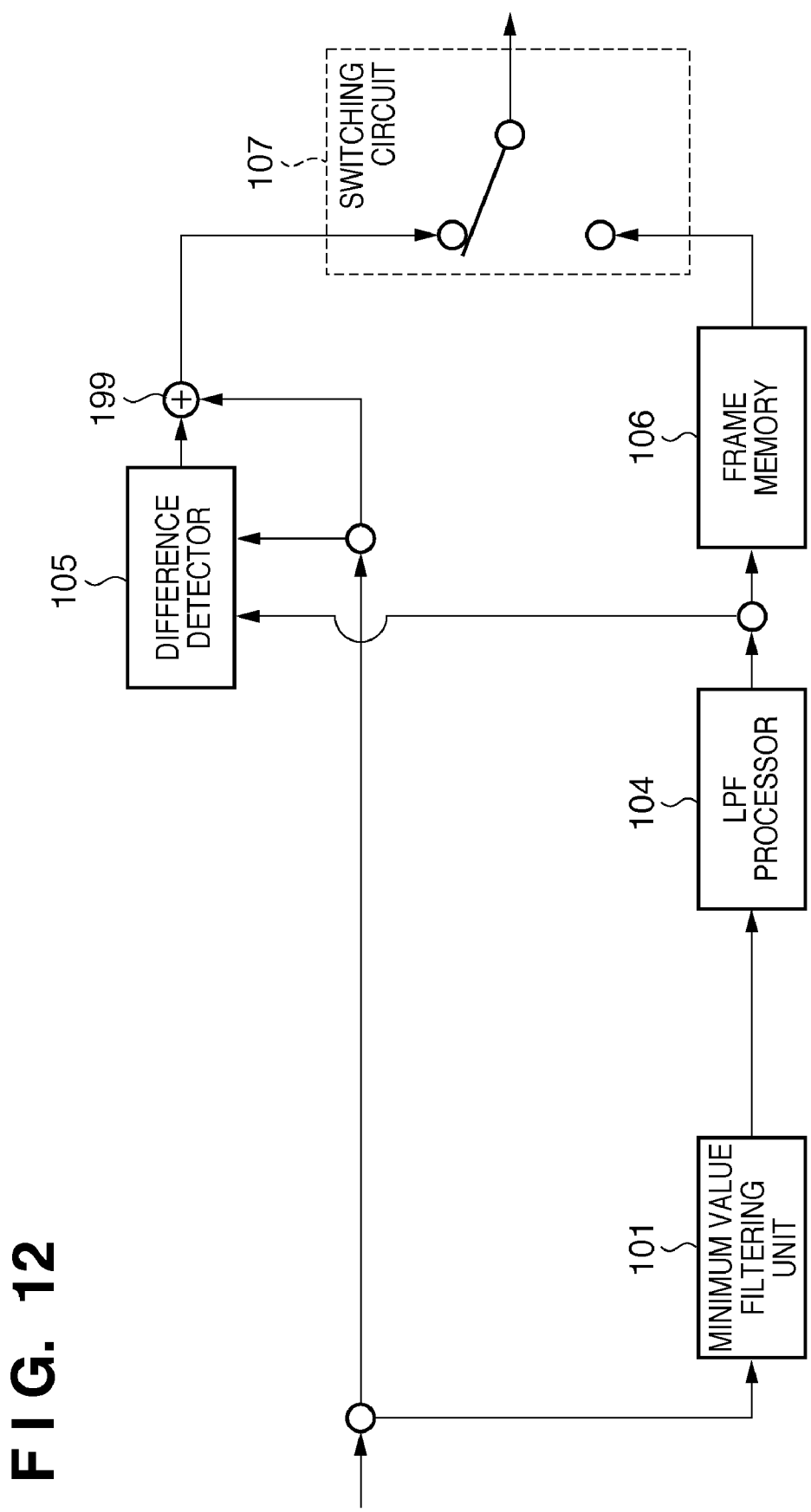
FIG. 12 is a block diagram showing the apparatus arrangement when a minimum value filtering unit 101 is added.

On the other hand, the difference detector 105 calculates a difference image as a second sub-frame image by subtracting the first sub-frame image obtained by the gain correction unit 706 from the frame image of interest input from the input terminal 150. FIG. 8F shows a waveform of the second sub-frame image obtained by subtracting the updated low frequency component image having the waveform shown in FIG. 8E from the frame image of interest having the waveform shown in FIG. 8A. Then, the difference detector 105 outputs the calculated second sub-frame image to the subsequent switching circuit 107.

The switching circuit 107 alternately displays two sub-frames (first and second sub-frame images) at desired timings, for example, at cycles of 120 Hz in case of an input at 60 Hz. When the sub-frame image having the waveform shown in FIG. 8F and that having the waveform shown in FIG. 8E are alternately displayed at high speed, the user can visually perceive them to have the same waveform as that of the input frame image (FIG. 8A) displayed at 60 Hz.

In this manner, although the hold type and impulse type have different generation modes of a sub-frame image, they have a common process in that a difference image obtained by subtracting the sub-frame image including only low frequency components from the input frame image does not assume a negative value.

FIG. 9 is a flowchart showing processing performed by the image processing apparatus according to this embodiment. In step S901, a controller (not shown) of the image processing apparatus initializes variables, parameters, and the like used in respective processes to be described below. For example, the controller initializes a size of a minimum value filter used in the minimum value filtering unit 101, the static property of the low-pass filter used in the LPF processor 104, and a gain correction amount used in the gain correction unit 706.

The controller checks in step S902 whether or not to end this processing. Various conditions for ending this processing are available. However, since these conditions are not important in this embodiment, a description thereof will not be given. As a result of this checking, if the processing is to end, the controller executes a process for ending this processing; otherwise, the process advances to step S903.

In step S903, the input terminal 150 acquires a frame image of interest, and outputs it to the difference detector 105, minimum value intensity controller 102, minimum value filtering unit 101, and composition unit 103.

In step S904, the minimum value filtering unit 101 generates a processed image by applying the minimum value filtering processing to the frame image of interest input from the input terminal 150, and outputs the generated processed image to the minimum value intensity controller 102 and composition unit 103.

In step S905, the minimum value intensity controller 102 acquires the frame image of interest received from the input terminal 150 and the processed image received from the minimum value filtering unit 101, and executes the process for calculating the composite ratio a using these images.

In step S906, the composition unit 103 generates a composite image by compositing the frame image of interest received from the input terminal 150 and the processed image received from the minimum value filtering unit 101 according to the composite ratio a calculated in step S905.

In step S907, the LPF processor 104 generates an image configured by low frequency components (including only low frequency components) (low frequency component image) by applying two-dimensional low-pass filtering processing to the composite image generated by the composition unit 103. The generated low frequency component image is output to the gain correction unit 706.

In step S908, the gain correction unit 706 applies the gain correction processing to the low frequency component image output from the LPF processor 104 by lowering luminance values of respective pixels that configure the low frequency component image (for example, lowering them by 50%). In this way, the unit 706 updates this low frequency component image as a first sub-frame image.

In step S909, the difference detector 105 calculates a difference image as a second sub-frame image by subtracting the first sub-frame image obtained by the gain correction unit 706 from the frame image of interest input from the input terminal 150.

The switching circuit 107 checks in step S910 which of the high frequency component image (second sub-frame image) and low frequency component image (first sub-frame image) is to be displayed at the current display timing. As described above, since the switching circuit 107 alternately displays the first and second sub-frame images at, for example, 120 Hz, it checks which of the sub-frame images is to be displayed at the current timing. If the first sub-frame image is to be displayed, the process advances to step S911; if the second sub-frame image is to be displayed, the process advances to step S912.

In step S911, the switching circuit 107 displays the low frequency component image as the first sub-frame image. In step S912, the switching circuit 107 displays the high frequency component image as the second sub-frame image.

A characteristic feature of this embodiment lies in that a gain difference between an edge gradient region and edge in the first sub-frame image is minimized. In case of the impulse type display device, the first sub-frame image is displayed at an instance of first $\frac{1}{120}$ sec, and the second sub-frame image is displayed at an instance of next $\frac{1}{120}$ sec. An apparent waveform at a time average of $\frac{1}{60}$ sec is the same as that of the input frame image.

Third Embodiment

This embodiment will explain an image processing apparatus as a hold type display device. Note that this embodiment is similar to the first embodiment, and a description about the same portions as in the first embodiment will not be repeated.

Figure 14:
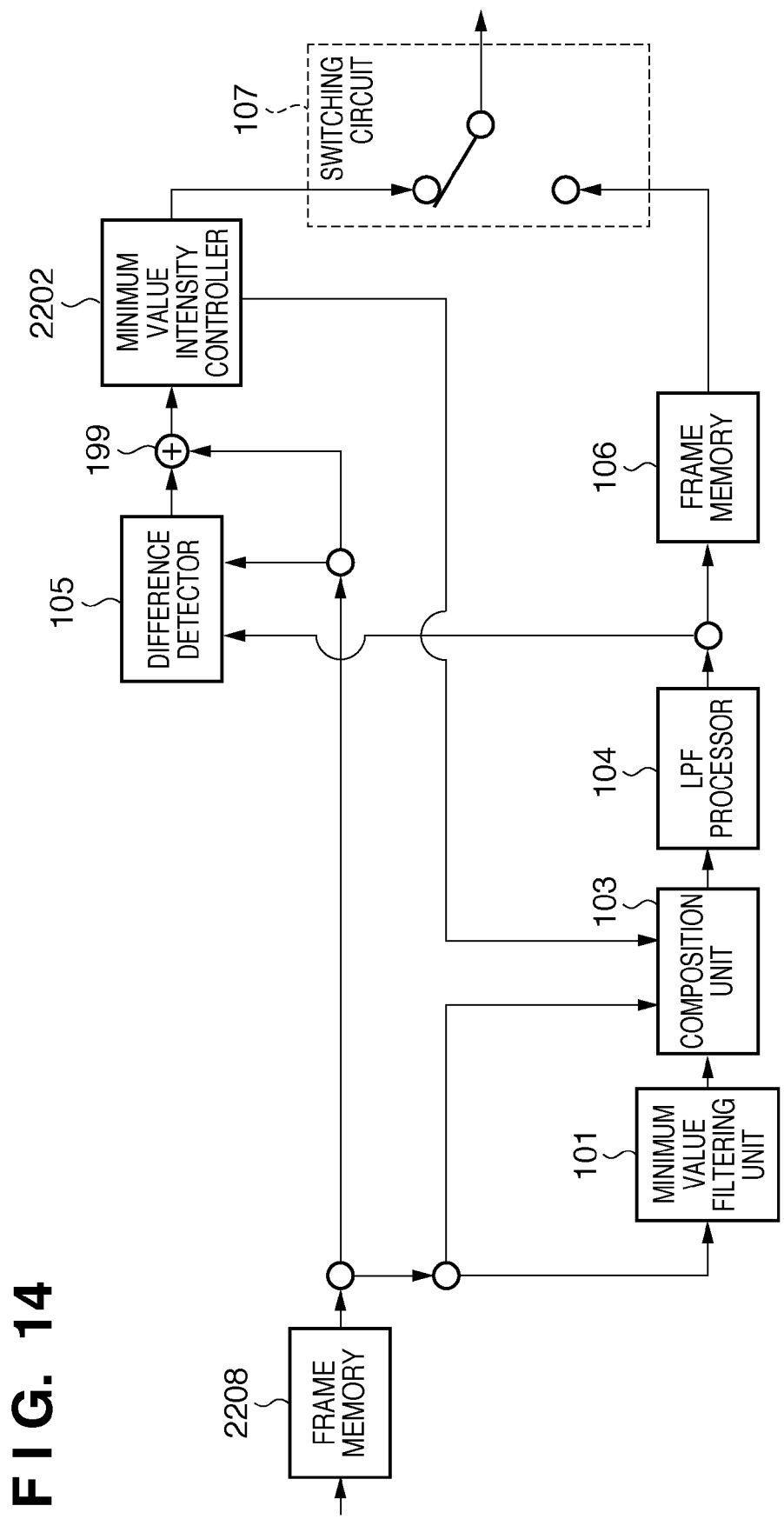
FIG. 14 is a block diagram showing an example of the functional arrangement of an image processing apparatus according to the third embodiment.

FIG. 14 is a block diagram showing an example of the functional arrangement of the image processing apparatus according to this embodiment. Note that the same reference numerals in FIG. 14 denote the same components as in FIG. 1, and a description thereof will not be given.

A composition unit 103 composites a processed image generated by a minimum value filtering unit 101, and a frame image of interest based on a composite ratio a as in the first embodiment. In this case, assume that the composite ratio a is initialized to 0.0. This composite ratio a can be updated by a minimum value intensity controller 2202 later. Assume that the composite ratio a used in the minimum value intensity controller 2202 is initialized to 0.0.

By operating the minimum value filtering unit 101, the composition unit 103, an LPF processor 104, a difference detector 105, and an adder 199 while initializing the composite ratio a to 0.0, a frame memory 106 stores a low frequency component image. Furthermore, the minimum value intensity controller 2202 receives a high frequency component image from the adder 199.

Upon reception of the high frequency component image from the adder 199, the minimum value intensity controller 2202 checks with reference to respective pixel values that configure this high frequency component image if pixels having pixel values smaller than zero are included. If no such pixels are included, the minimum value intensity controller 2202 outputs the high frequency component image received from the adder 199 intact to a subsequent switching circuit 107. On the other hand, if such pixels are included, the minimum value intensity controller 2202 updates the composite ratio a set in itself by adding a predetermined value b ($0<b\leq1$) to the value of the composite ratio a. The minimum value intensity controller 2202 then settles the updated composite ratio a as a final result, and sets the settled composite ratio a in the composition unit 103. Then, the minimum value intensity controller 2202 controls the composition unit 103 to execute composition processing again using the newly set composite ratio a.

Of course, the LPF processor 104 generates a new low frequency component image using a composite image generated by the composition processing (that using the composite ratio a updated by the minimum value intensity controller 2202) executed again by the composition unit 103. The adder 199 generates a new high frequency component image using the newly generated low frequency component image and the frame image of interest. The minimum value intensity controller 2202 outputs the newly generated high frequency component image to the subsequent switching circuit 107.

Figure 13A:
FIGS. 13A to 13F are graphs showing waveforms of frame images obtained in respective stages by the apparatus having the arrangement shown in FIG. 12.
Figure 13D:
Figure 13B:
Figure 13E:
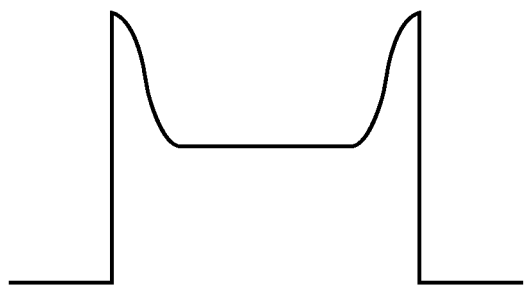
Figure 13C:
Figure 13F:

With this arrangement, when the user views images which are output from the switching circuit 107 and are displayed, he or she can visually perceive them to have the same waveform as that (FIG. 13A) of the input frame image displayed at 60 Hz.

A large difference of this embodiment from the first embodiment lies in that the first embodiment analyzes the frame image of interest to calculate the composite ratio a, while this embodiment analyzes the high frequency component image to calculate the composite ratio a. In other words, the image processing apparatus according to the first embodiment executes feedforward control, while the image processing apparatus according to this embodiment executes feedback control. Also, in this embodiment, since the processing executed by the minimum value intensity controller 2202 is simpler than the first embodiment, the arrangement of the overall image processing apparatus can be more simplified.

Fourth Embodiment

This embodiment will explain an image processing apparatus as an impulse type display device. Note that this embodiment is similar to the second embodiment, and a description about the same portions as in the second embodiment will not be repeated.

FIG. 15 is a block diagram showing an example of the functional arrangement of the image processing apparatus according to this embodiment. Note that the same reference numerals in FIG. 15 denote the same components as in FIGS. 1 and 7, and a description thereof will not be given.

A composition unit 103 composites a processed image generated by a minimum value filtering unit 101, and a frame image of interest based on a composite ratio a as in the first embodiment. In this case, assume that the composite ratio a is initialized to 0.0. This composite ratio a can be updated by a minimum value intensity controller 2302 later. Assume that the composite ratio a used in the minimum value intensity controller 2302 is initialized to 0.0.

By operating the minimum value filtering unit 101, the composition unit 103, an LPF processor 104, a gain correction unit 706, and a difference detector 105 while initializing the composite ratio a to 0.0, the gain correction unit 706 outputs a low frequency component image. Furthermore, the difference detector 105 inputs a difference image to the minimum value intensity controller 2302.

Upon reception of the difference image from the difference detector 105, the minimum value intensity controller 2302 checks with reference to respective pixel values that configure this difference image if pixels having pixel values smaller than zero are included. If no such pixels are included, the minimum value intensity controller 2302 outputs the difference image received from the difference detector 105 intact to a subsequent switching circuit 107. On the other hand, if such pixels are included, the minimum value intensity controller 2302 updates the composite ratio a set in itself by adding a predetermined value b ($0<b\leq 1$) to the value of the composite ratio a. The minimum value intensity controller 2302 then settles the updated composite ratio a as a final result, and sets the settled composite ratio a in the composition unit 103. Then, the minimum value intensity controller 2302 controls the composition unit 103 to execute composition processing again using the newly set composite ratio a.

Of course, the LPF processor 104 generates a new low frequency component image using a composite image generated by the composition processing (that using the composite ratio a updated by the minimum value intensity controller 2302) executed again by the composition unit 103. The difference detector 105 generates a new difference image using the newly generated low frequency component image and the frame image of interest. The minimum value intensity controller 2302 outputs the newly generated difference image to the subsequent switching circuit 107.

With this arrangement, when the user views images which are output from the switching circuit 107 and are displayed, he or she can visually perceive them to have the same waveform as that (FIG. 13A) of the input frame image displayed at 60 Hz.

A large difference of this embodiment from the second embodiment lies in that the second embodiment analyzes the frame image of interest to calculate the composite ratio a, while this embodiment analyzes the difference image to calculate the composite ratio a. In other words, the image processing apparatus according to the second embodiment executes feedforward control, while the image processing apparatus according to this embodiment executes feedback control. Also, in this embodiment, since the processing executed by the minimum value intensity controller 2302 is simpler than the second embodiment, the arrangement of the overall image processing apparatus can be more simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-138647 filed Jun. 9, 2009 which is hereby incorporated by reference herein in its entirety.

What is claimed is:

1. An image processing apparatus, which converts a frame rate by dividing an input frame into subframes and outputting the subframes, comprising:
    a preprocessing unit that performs preprocessing of replacing a pixel value of a pixel of interest with a minimum pixel value of peripheral pixels of the pixel of interest in an input frame;
    a composition unit comprising a composition generating unit that generates a composite image by performing a composition process on the input frame and the input frame having undergone the preprocessing, according to a composite ratio (a);
    a low-pass filter processing unit that generates a first subframe by performing a lowpass filtering process on the composite image;
    a generating unit that generates a second subframe from the first subframe and the input frame; and
    a switching unit that outputs the first subframe and the second subframe by switching the first subframe and the second subframe at a predetermined timing.

2. The apparatus according to claim 1, wherein said generating unit is configured to generate the second subframe by adding a difference between the first subframe and the input frame to the input frame.

3. The apparatus according to claim 1, wherein said low-pass filter processing unit is configured to generate the first subframe by applying a gain correction to a frame resulting from the low-pass filtering process, and wherein said generating unit is configured to generate the second subframe by subtracting the first subframe from the input frame.

4. The apparatus according to claim 1, wherein the composition unit further comprises a calculation unit that calculates a minimum composite ratio (a) so that pixel values of the second subframe are not less than zero.

5. The apparatus according to claim 1, further comprising a calculation unit that calculates a minimum composite ratio (a) based on the input frame and the input frame having undergone the preprocessing, and
    wherein said composition generating unit is configured to generate the composite image in accordance with the calculated minimum composite ratio (a).

6. The apparatus according to claim 1, further comprising a calculation unit that determines, based on the output from the generating unit, whether the second subframe includes pixels having pixel values less than zero,
    wherein the calculation unit is configured, if such pixels having pixel values less than zero are included in the second subframe, to update the composite ratio (a) by adding a predetermined value (b) to the value of the composite ratio (a), and wherein the composition generating unit, the low-pass filter processing unit and the generating unit are configured to repeat their respective processes in accordance with the updated composite ratio (a+b) in order to output an updated second subframe to the switching unit.

7. The apparatus according to claim 6, wherein the calculation unit is configured, if it is determined that no such pixels having pixel values less than zero are included in the second subframe, to output the second subframe to the switching unit.

8. The apparatus according to claim 4, wherein said calculation unit comprises:
a unit that specifies from the input frame an edge region in which a contrast change ratio is not less than a threshold;
a first unit that generates a partial composite image by defining an image in the specified edge region as a first image and an image in a region in the input frame having undergone the preprocessing corresponding to the edge region as a second image, and compositing the first image and the second image at said composite ratio (a);
a second unit that generates a low frequency component partial image configured by low frequency components by applying low-pass filtering processing to the partial composite image; and
a third unit that generates a high frequency component partial image configured by high frequency components by generating a difference image between the first image and the low frequency component partial image, and adding the generated difference image to the first image,
wherein said calculation unit is configured to calculate said minimum composite ratio (a) so that all pixel values of pixels which configure the high frequency component partial image are not less than zero, and
wherein said composition generating unit is configured to generate the composite image by compositing the input frame having undergone the preprocessing and the input frame at the composite ratio (a) calculated by said calculation unit.

9. The apparatus according to claim 8, wherein said calculation unit is configured, when the pixel values of the pixels which configure the high frequency component partial image calculated by said first unit, said second unit, and said third unit are not less than zero, to update the composite ratio (a) by subtracting a predetermined value (b) from a value of the composite ratio (a), and to cause said first unit, said second unit, and said third unit to execute their respective functions again using the updated composite ratio (a−b), and
wherein said calculation unit is further configured, when pixels that configure the high frequency component partial image calculated by said first unit, said second unit, and said third unit include pixels having pixel values smaller than zero, to update the composite ratio (a) by adding the same or another predetermined value (b) to the value of the composite ratio (a), and to set the updated composite ratio (a+b) as the minimum composite ratio (a).

10. The apparatus according to claim 3, further comprising a calculation unit configured to determine, based on the output from the generating unit, whether the second subframe includes pixels having pixel values less than zero;
wherein the calculation unit is configured, if such pixels having pixel values less than zero are included in the second subframe, to update the composite ratio (a) by adding a predetermined value (b) to the value of the composite ratio (a), and wherein the composition generating unit, the low-pass filter processing unit and the generating unit are configured to repeat their respective processes in accordance with the updated composite ratio (a+b) in order to output an updated second subframe to the switching unit, and
wherein said calculation unit comprises:
(1) a unit that specifies from the input frame one edge region in which a contrast change ratio is not less than a threshold;
(2) a first unit that generates a partial composite image by defining an image in the specified edge region as a first image and an image in a region in the input frame having undergone the preprocessing corresponding to the edge region as a second image, and compositing the first image and the second image at said composite ratio (a);
(3) a second unit that generates a low frequency component partial image configured by low frequency components by applying low-pass filtering processing to the partial composite image; and
(4) a third unit that updates the low frequency component partial image by applying gain correction processing to the low frequency component partial image, and generates a difference image between the updated low frequency component partial image and the first image,
wherein said calculation unit is configured to calculate a minimum composite ratio (a) so that all pixel values of pixels which configure the difference image generated by said third unit are not less than zero, and
wherein said composition generating unit is configured to generate the composite image by compositing the input frame having undergone the preprocessing and the input frame at the composite ratio (a) calculated by said calculation unit.

11. The apparatus according to claim 10, wherein said calculation unit is configured, when the pixel values of all the pixels which configure the difference image calculated by said first unit, said second unit, and said third unit are not less than zero, to update the composite ratio (a) by subtracting a predetermined value from a value of the composite ratio (a), and is also configured to cause said first unit, said second unit, and said third unit to execute their respective processes again using the updated composite ratio (a), and
wherein the calculation unit is configured, when pixels that configure the difference image calculated by said first unit, said second unit, and said third unit include pixels having pixel values smaller than zero, to update the composite ratio (a) by adding the same or another predetermined value (b) to the value of the composite ratio (a), and to set the updated composite ratio (a) as the minimum composite ratio (a).

12. An image processing method for an image processing apparatus which converts a frame rate by dividing an input frame into subframes and outputting the subframes, comprising:
a preprocessing step for performing preprocessing of replacing a pixel value of a pixel of interest with a minimum pixel value of peripheral pixels of the pixel of interest in an input frame;
a composition step for generating a composite image by performing a composition process on the input frame and the input frame having undergone the preprocessing, according to a composite ratio (a);
a low-pass filter processing step for generating a first subframe by performing a lowpass filtering process on the composite image;
a generating step for generating a second subframe from the first subframe and the input frame; and
a switching step for outputting the first subframe and the second subframe by switching the first subframe and the second subframe at a predetermined timing.

13. The image processing method according to claim 12, wherein in the generating step, the second subframe is generated by adding a difference between the first subframe and the input frame to the input frame,
wherein the composition step comprises:
(1) a step of specifying from the input frame one edge region in which a contrast change ratio is not less than a threshold;
(2) a first step of generating a partial composite image by defining an image in the specified edge region as a first image and an image in a region in the input frame having undergone the preprocessing corresponding to the edge region as a second image, and compositing the first image and the second image at said composite ratio (a);
(3) a second step of generating a low frequency component partial image configured by low frequency components by applying low-pass filtering processing to the partial composite image;
(4) a third step of generating a high frequency component partial image configured by high frequency components by generating a difference image between the first image and the low frequency component partial image, and adding the generated difference image to the first image; and
(5) a calculation step of calculating a minimum composite ratio (a) so that all pixel values which configure the high frequency component partial image are not less than zero, and
wherein in the composition step, the composite image is generated by compositing the input frame having undergone the preprocessing and the input frame at the composite ratio (a) calculated in the calculation step.

14. The image processing method according to claim 12, further comprising:
a step of calculating a minimum composite ratio (a) so that all pixel values of which configure the high frequency component partial image are not less than zero; and
a control step for causing the composition step, the low pass filter processing step and the generating step to repeat their respective processing steps using the calculated composite ratio (a) in order to output an updated second subframe.

15. The image processing method according to claim 12, further comprising:
an updating step of updating the first subframe by applying gain correction processing to a frame as a result of the low-pass filtering process;
wherein in the generating step, a difference image between the first subframe updated in the updating step and the input frame is generated,
wherein the composition step comprises:
(1) a step of specifying from the input frame one edge region in which a contrast change ratio is not less than a threshold;
(2) a first step of generating a partial composite image by defining an image in the specified edge region as a first image and an image in a region in the input frame having undergone the preprocessing corresponding to the edge region as a second image, and compositing the first image and the second image at the composite ratio (a);
(3) a second step of generating a low frequency component partial image configured by low frequency components by applying low-pass filtering processing to the partial composite image;
(4) a third step of updating the low frequency component partial image by applying gain correction processing to the low frequency component partial image, and generating a difference image between the updated low frequency component partial image and the first image; and
(5) a calculation step of calculating a minimum composite ratio (a) so that all pixel values which configure the difference image calculated in the third step are not less than zero,
wherein in the composition step, the composite image is generated by compositing the input frame having undergone the preprocessing and the input frame at the composite ratio (a) calculated in the calculation step.

16. The image processing method according to claim 12, further comprising:
an updating step of updating the first subframe by applying gain correction processing to a frame as a result of the low-pass filtering process, wherein in the generating step, a difference image between the first subframe updated in the updating step and the input frame is generated;
a calculation step of calculating a minimum composite ratio (a) so that all pixel values which configure the difference image are not less than zero; and
a control step for causing the composition step, the low pass filter processing step and the generating step to repeat their respective processing steps using the calculated composite ratio (a) in order to output an updated second subframe to the switching step.

* * * * *